United States Patent [19]

Hodgson, Sr.

[11] Patent Number: 5,228,227

[45] Date of Patent: Jul. 20, 1993

[54] FISHING APPARATUS

[76] Inventor: Stanley R. J. Hodgson, Sr., 14521-118st., Edmonton, Alberta, Canada, T5X 1K4

[21] Appl. No.: 693,927

[22] Filed: Apr. 25, 1991

[30] Foreign Application Priority Data

Dec. 23, 1988 [CA] Canada ................................. 587044

[51] Int. Cl.$^5$ ...................... A01K 91/06; A01K 97/12
[52] U.S. Cl. ........................................... 43/15; 43/54.1; 43/17; 297/15; 403/98; 403/116; 403/117
[58] Field of Search ...................... 43/15, 16, 17, 21.2, 43/54.1; 297/15; 403/98, 116, 117

[56] References Cited

U.S. PATENT DOCUMENTS

| 1,883,322 | 10/1932 | Abbott | 403/117 |
| 2,558,915 | 7/1951 | Sheffer | 403/98 |
| 2,705,122 | 3/1955 | Whitehead | 403/98 |
| 2,721,631 | 10/1955 | Honold | 403/98 |
| 2,757,030 | 7/1956 | Koppel | 403/116 |
| 3,484,831 | 12/1969 | Higuchi | 403/116 |
| 4,434,573 | 3/1984 | Hodshire | 43/15 |
| 4,918,853 | 4/1990 | Bascom | 43/54.1 |
| 4,980,986 | 1/1991 | Harper | 43/17 |

FOREIGN PATENT DOCUMENTS 332320 11/1935 Italy ..................................... 403/117

Primary Examiner—Kurt C. Rowan
Attorney, Agent, or Firm—Davis, Bujold & Streck

[57] ABSTRACT

A coupler for collapsible joints consisting of a hollow body having an interior cavity, an exterior surface with an arcuate portion, and an arcuate slot extending radially from the interior cavity to the exterior surface over at least 90 degrees of the arcuate portion. A receptacle is provided for attaching a first support member to the body. An elongate fastening member extends through the slot, and is adapted to extend into a second support member thereby securing the body to the second support member. The body rotates about a first axis transverse to the fastening member to the extent that clearance is provided by the slot thereby positioning the support member between a first position in parallel alignment with the base and a second position substantially at right angles to the base. In the second position the body is rotatable about a second axis provided by the fastening member to alter the rotational positioning of the slot relative to the fastening member.

10 Claims, 8 Drawing Sheets

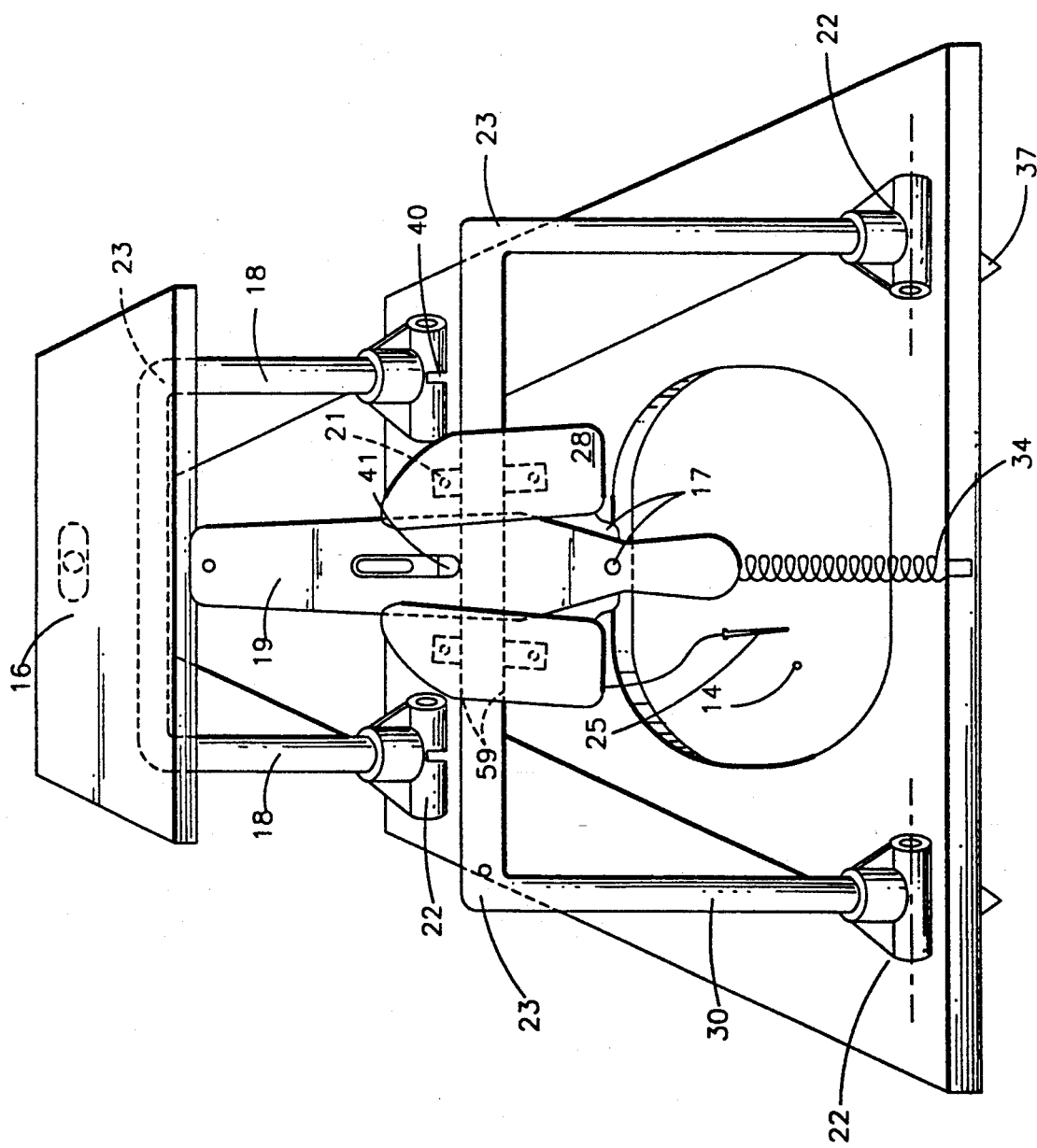

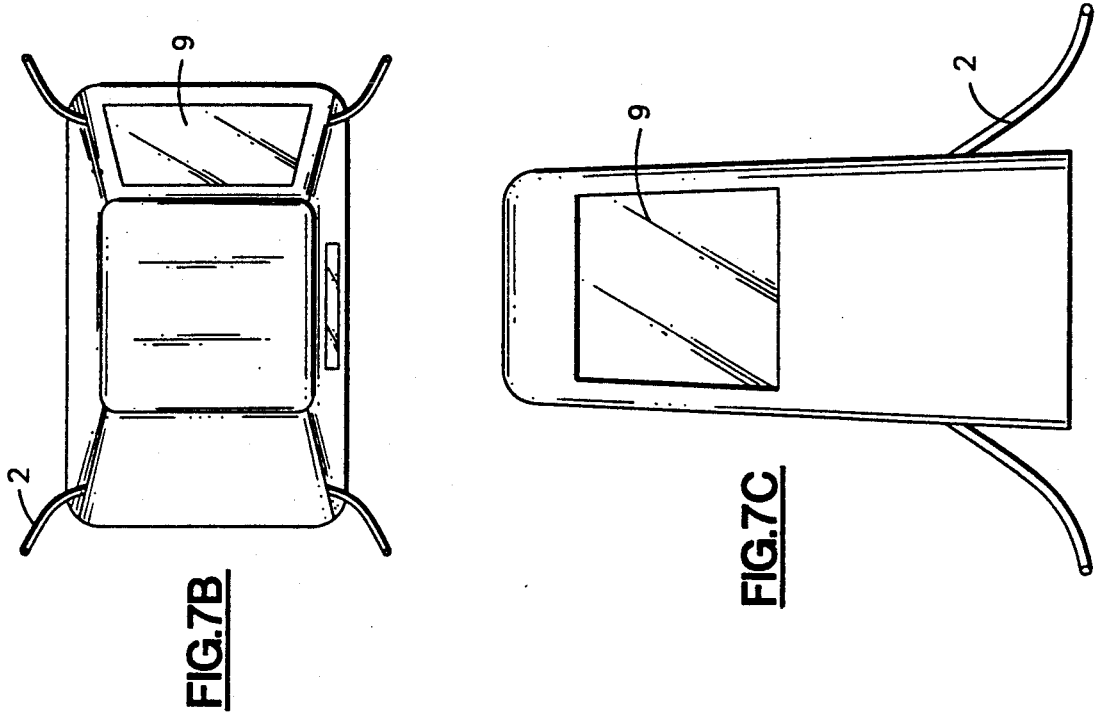
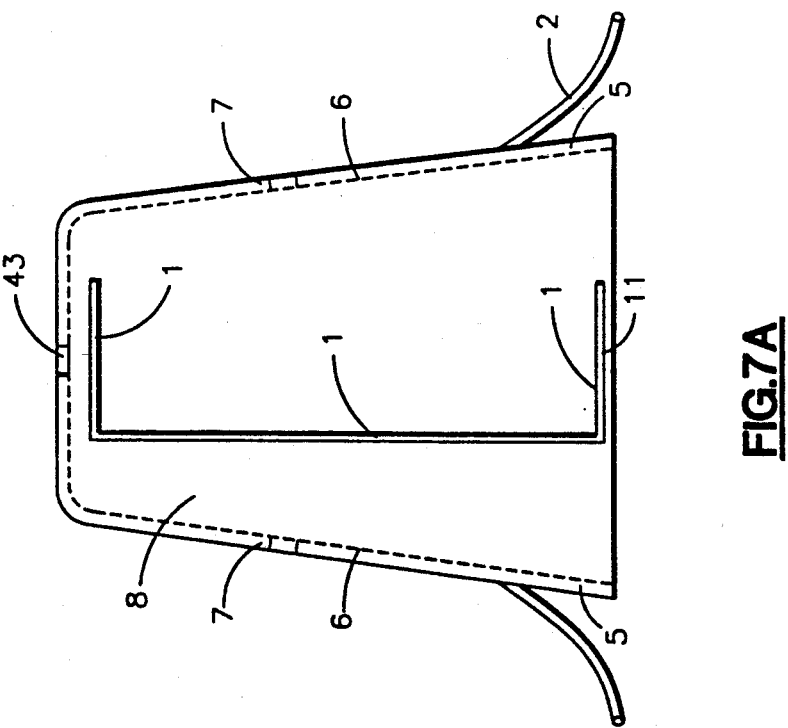

FISHING APPARATUS

The present invention relates to a coupler for collapsible joints.

BACKGROUND OF THE INVENTION

This invention relates to a coupling device which has the ability to rotate through two axes and is for the purpose of connecting two members, one of which, preferably, has a planar surface. It can be used to connect a folding leg to a table, a fold down shelf to a wall, or any similar actions requiring two positions, one of which is locked in place.

The invention provides particular advantages in applications, such as ice fishing, where equipment must be carried over a distance to a remote location and assembled on site.

SUMMARY OF THE INVENTION

What is required is a coupler for collapsible joints which facilitates the collapse of the joint for ease of transport.

According to the present invention there is provided a coupler for collapsible joints, which is comprised of a hollow body having an interior cavity, an exterior surface with an arcuate portion, and an arcuate slot extending radially from the interior cavity to the exterior surface over at least 90 degrees of the arcuate portion. Means is provided for attaching a first support member to the body. An elongate fastening member extends through the slot, and is adapted to extend into a second support member thereby securing the body to the second support member. The body rotates about a first axis transverse to the fastening member to the extent that clearance is provided by the slot thereby positioning the support member between a first position in parallel alignment with the base and a second position substantially at right angles to the base. In the second position the body is rotatable about a second axis provided by the fastening member to alter the rotational positioning of the slot relative to the fastening member. Means are positioned within the interior cavity of the body to retain the fastening member within the slot.

BRIEF DESCRIPTION OF THE DRAWINGS

These and other features of the invention will become more apparent from the following description in which reference is made to the appended drawings, wherein:

FIG. 1B is a front perspective view of the ice fishing apparatus illustrated in FIG. 1A.

FIG. 7A is a longitudinal section view of a tent developed for use with the ice fishing apparatus illustrated in FIG. 1A.

FIG. 7B is a top plan view of the tent illustrated in FIG. 7A.

FIG. 7C is a side elevation plan view of the tent illustrated in FIG. 7A.

DETAILED DESCRIPTION OF THE PREFERRED EMBODIMENT

Figure 1A:
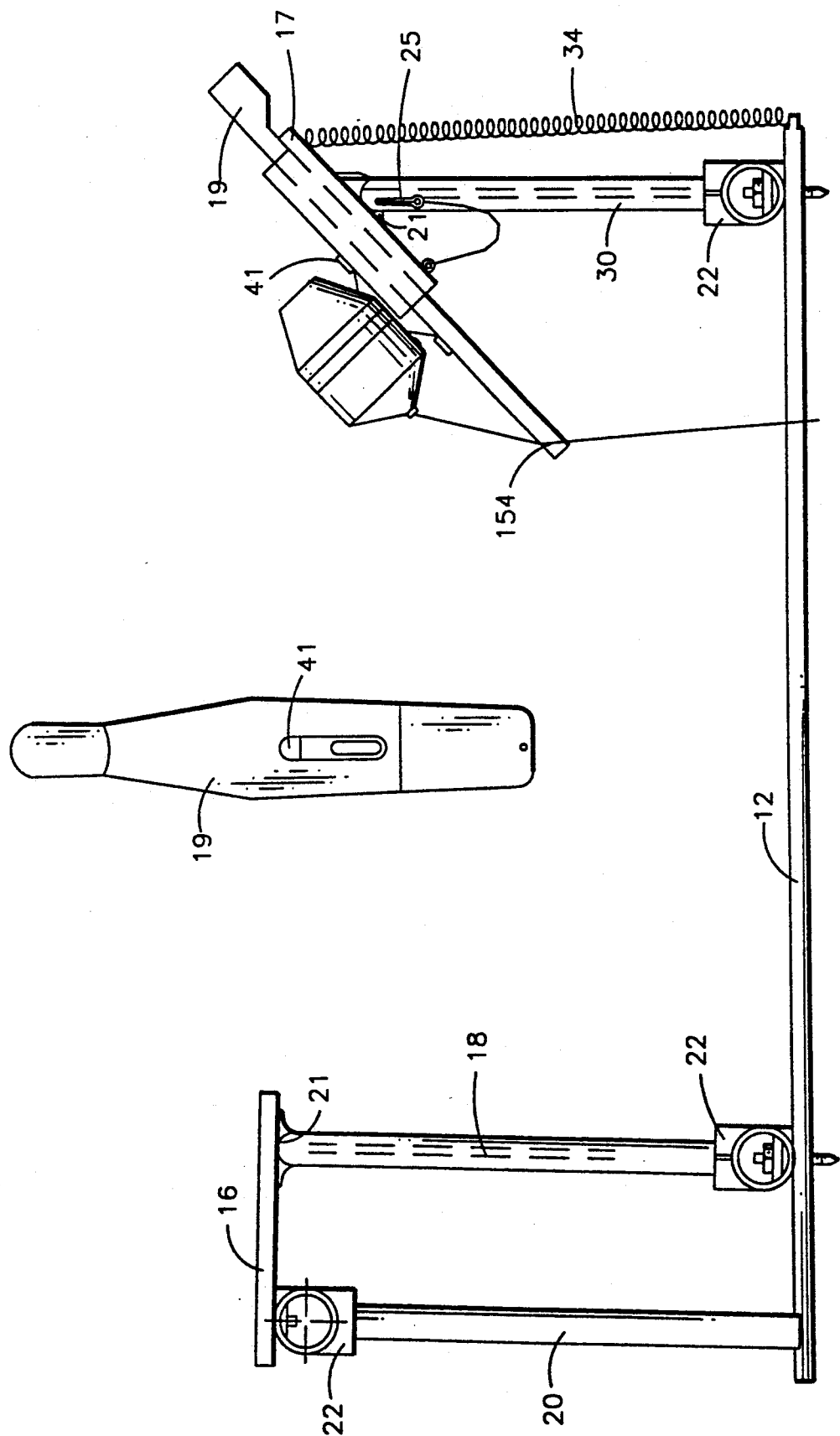
FIG. 1A is a side elevation view of an ice fishing apparatus constructed with couplers according to the teachings of the present invention.
Figure 1C:
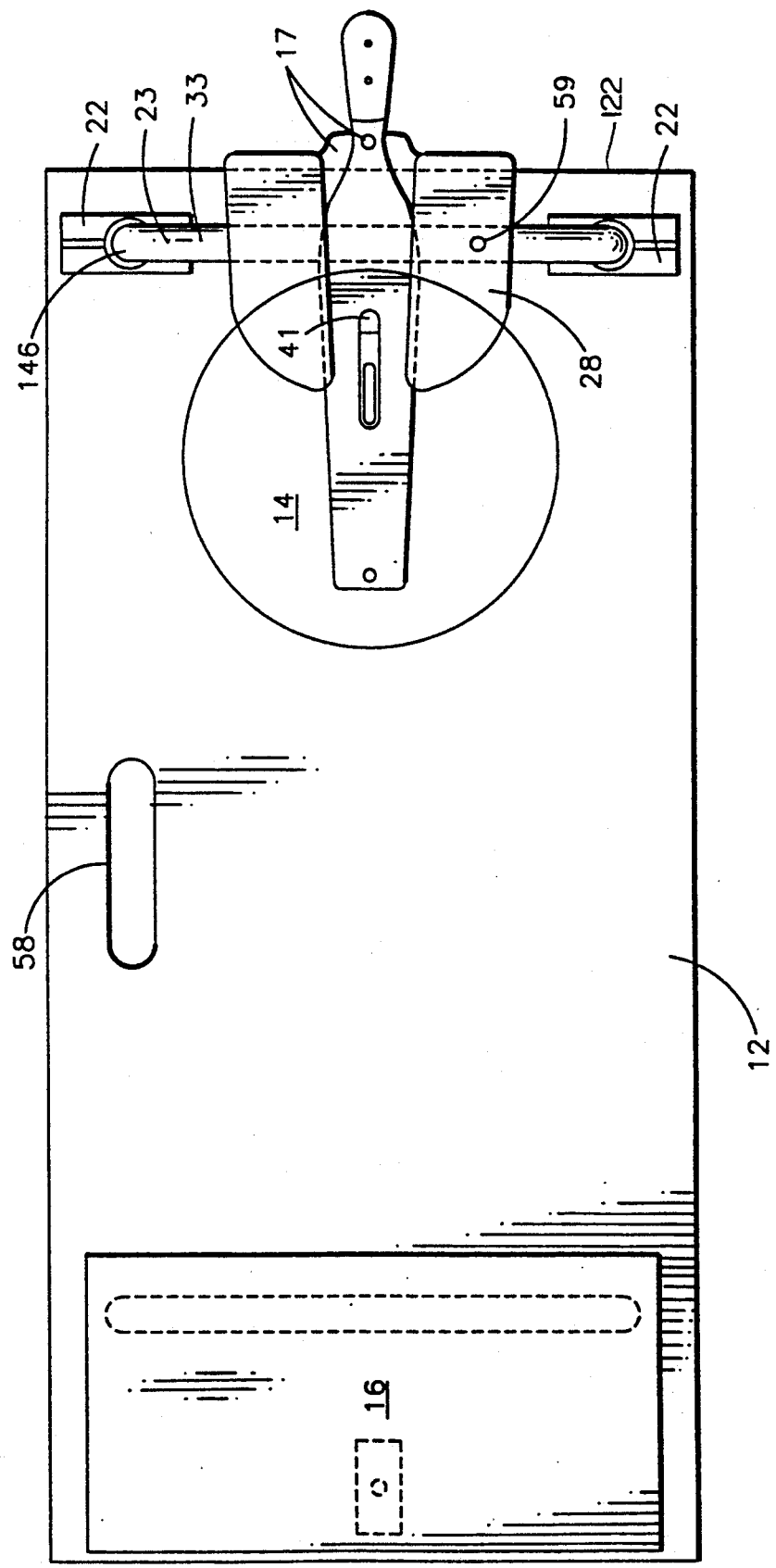
FIG. 1C is a top plan view of the ice fishing apparatus illustrated in FIG. 1A.
Figure 2:
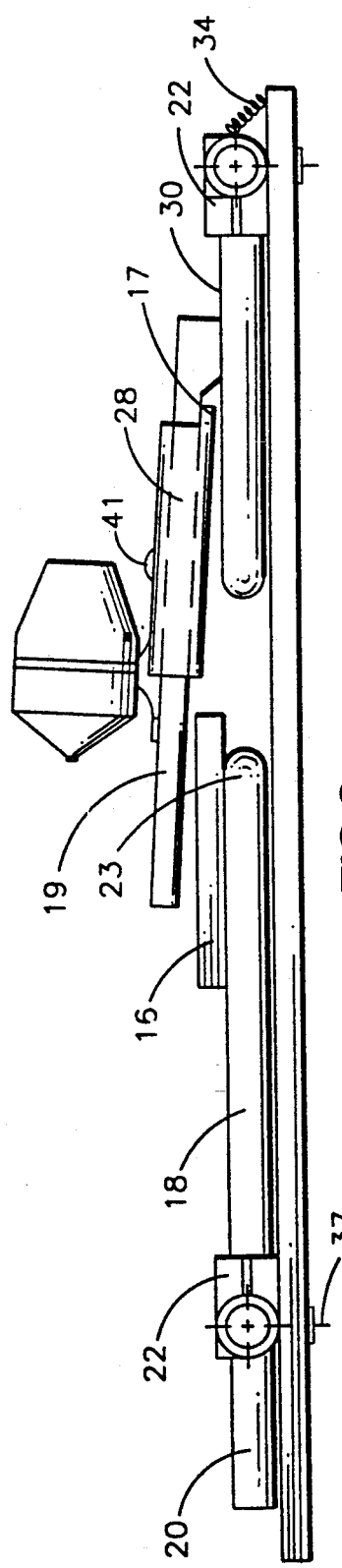
FIG. 2 is a side elevation view of the ice fishing apparatus illustrated in FIG. 1A in a collapsed state.
Figure 6:
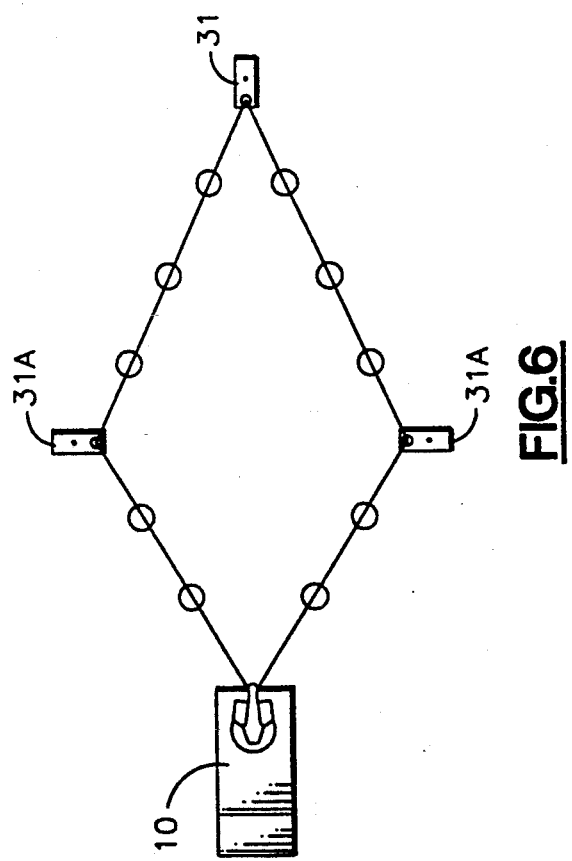
FIG. 6 is diagrammatic top plan view of the manner of use of the ice fishing apparatus illustrated in FIG. 1A.

This invention relates to a coupling device (22) for collapsible joints which has the ability to rotate through two axes and is for the purpose of connecting two members, one of which, preferably, has a planar surface. Coupling device 22 will now be described with reference to FIGS. 4A through 4D. Coupling device 22 will be described in relation to ice fishing apparatus illustrated in FIGS. 1A through 3 and 5 through 7C. It will be appreciated by a person skilled in the art that coupling device 22 can be used to connect a folding leg to a table, a fold down shelf to a wall, or any similar actions requiring two positions, one of which is locked in place.

Referring to FIGS. 4A through 4D, the rotatable coupler (22) is a hollow, cylindrical, "T" shaped, open ended receptacle body 102 having two arms 104 and 106; the first being a vertical arm 104, and the second being a horizontal arm 106 forming the "T" shape. Hollow body 102 has an exterior surface 108 with an arcuate portion 110 on second arm 106. The second arm 106 of the rotatable coupler 22 is generally circular when viewed from its second end, except for the quadrant of the circle from 180 degrees to 270 degrees (35). A vertical line drawn downward from the 180 degree point will intersect a line drawn horizontally from the 270 degree point and forming a square corner (35) on the lower right hand side of the otherwise circular shape of the second arm 106 of the rotatable coupler (22). Hollow body 102 has an interior cavity 112. An arcuate slotted opening (40) in line with first arm 104 of the inverted "T" shaped body 102 and running from the bottom, up arcuate portion 110 of second arm 106, and in a line perpendicular to second arm 106 and forming a slotted arc shaped opening ¼ to ⅓ the way around the circumference of second arm 106. Arcuate slot 40 extends radially from interior cavity 112 to exterior surface 108 over at least 90 degrees of arcuate portion 110.

It is intended that a support member, hereinafter called the "first member" be attached in some fashion to exterior surface 108 of body 102. A plurality of openings are provided as receptacles which serve as the means for attachment. The opening at the end of the first vertical arm 104 of the inverted "T" shaped body 102 shall be called the "first" end opening 114. The opening at the right end of the second arms 106 of the inverted "T" shaped body 102 when facing slotted opening 40, shall be called the "second" end opening 116. The opening opposite "second" end opening 116, shall be called the "third" end opening 118. A "seat" (29) or stopper is provided within each of the three end openings 114, 116, 118. On the inside perimeter of the first end opening 114, there are two vertical channels 26, which intersect a horizontal channel 26A around the full circumference of the inner surface of the first arm opening 114 at a position just above the "seat" (29) or stopper inside the first arm opening 114. These guide channels 26 and 26A allow a first member with two tits on the outside of its surface to be inserted into the first end opening 114 of the rotatable coupler 22, and to be rotated about the axis of the first arm opening 114, along "horizontal" channel 26A, thus locking the first member inside the first arm opening 114.

Figure 4B:
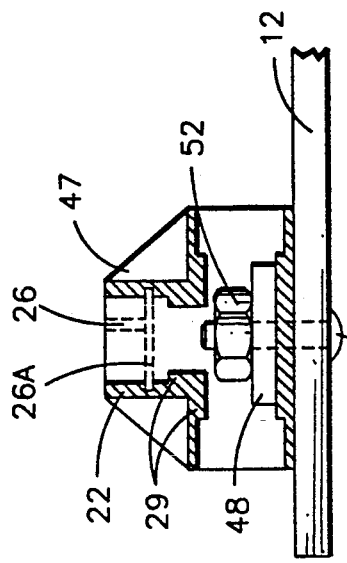
FIG. 4B is a longitudinal section view of an alternative manner of assembling the coupler illustrated in FIG. 4A.
Figure 4D:
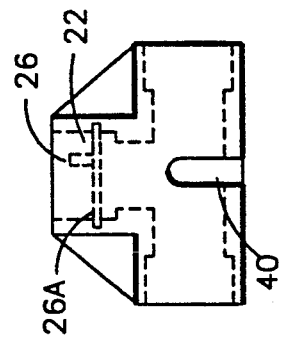
FIG. 4D is a side elevation view, partly in section, of the coupler illustrated in FIG. 4A.
Figure 4A:
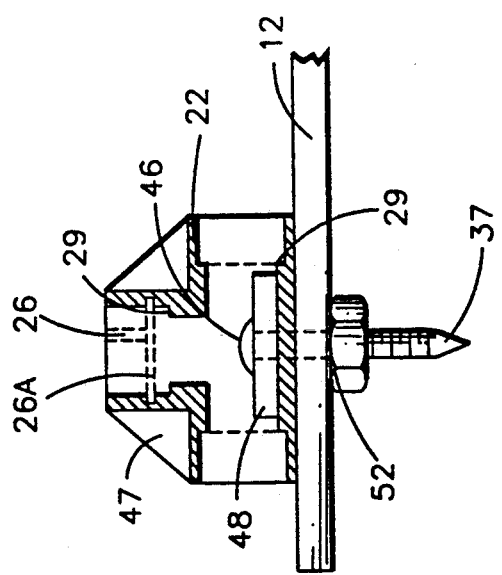
FIG. 4A is a longitudinal section view of the coupler used in the ice fishing apparatus illustrated in FIG. 1A
Figure 4C:
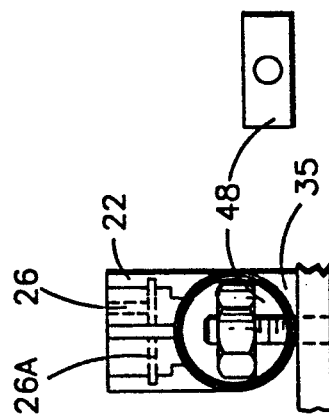
FIG. 4C is a transverse section view of the coupler illustrated in FIG. 4A.

FIGS. 4A and 4B illustrate two methods of connecting the coupler to a planar second member (12) by means of a locknut (52) and bolt (46). In FIG. 4A, the bolt (46) has a tip 37 designed for traction on ice or slippery surfaces In FIG. 4B, the bolt (52) is hidden inside the coupler (22). Gussets (47) are moulded as part of the rotatable coupler for added strength. Referring to FIG. 4B and 4C, the rotatable coupler (22) is connected to a planar second member (12) by means of a fastening member in the form of bolt (46) inserted through the second planar member through the slot (40) in the second arm 106, through arcuate washer (48) positioned within interior cavity 112 of body 102 inside the second arm 106, and secured by a nut (52). Referring to FIG. 4A, the placement of the bolt 46 may be reversed, with the bolt being inserted first through arcuate washer (48), the slot (40) in the second arm 106, and through the second planar member 12, and bolted on the bottom of the second planar member (12). The rotatable coupler has a direction stop (35) moulded on the second arm as illustrated in FIG. 4C. This direction stop is on the opposite side of the second arm as the arced slot is located (40). The arcuate washer (48) is a semi-cylindrical solid device which spreads the pressure of the bolt and locknut over a large portion of the inside surface of the second arm facilitation its easy movement through the 90 degree arc and adding strength to the structure of the coupler.

The use and operation of coupler 22 will now be described with reference to FIGS. 4A through 4D. FIGS. 4A and 4B illustrate two methods of connecting the coupler to a planar second member (12) by means of a locknut (52) and bolt (46). Grooves 26A and (26) are moulded into the inside surface of the first end of the coupler and intersect each other. These channel allow a first member with appropriate tits on it's outer surface to be inserted into the first end and rotated about its own axis when the tits reach the horizontal channel 26A thus locking the first member into the first arm 104 of the coupler 22. The Rotatable coupler 22 connected to a planar second member 12 has the ability to rotate about a second axis defined by bolt 46 and the first arm 104 360 degrees. It also has the ability to rotate through an arc from 0 degrees to approximately 90 degrees along a first axis transverse to bolt 46 as defined by the second arm 106 to the extent permitted by arcuate slot 40 and the square corner 35 both of which form a limit on that rotation. The rotatable coupler thus connected to a planar second member 12 will allow a first member connected to the first arm 104 to assume two positions. The first when the first and second members are parallel to each other and the second when the first member is pulled away from the second member to form a 90 degree "T" shape. When in this position, coupler 22, can be rotated 180 degrees about the axis of bolt 46 and the first arm 104, preventing the first member from returning to its first position parallel to the second member. This second position is the "up and locked" position, as will hereinafter be further described.

The use and operation of coupler 22 will now be described in relation to ice fishing equipment, illustrated in FIGS. 1A through 3, 5 through 7C. In a device for the improvement of comfort for ice fisherman, and to improve the ability of the fisherman to use and monitor several lines at once, the invention incorporates a collapsible chair, a collapsible fishing jig, and a base with carrying handle as well as a home to align over an augured hole in the ice surface, as well there is an apparatus to "flag" the pull of a fish on lines other than the main fishing line.

This invention relates to a portable and collapsible ice fishing seating and line monitoring device for the increased comfort of the fisherman.

An ice fisherman uses an auger to create an opening in the ice above a body of water. He then either lies down on the ice surface or sits on a portable lawn chair or other seating device adjacent to the opening and lowers a fishing line into the water. He may elect to use some of the prior devices on the market to allow for monitoring of more than one fishing line, but existing models are generally cumbersome and fragile, with multiple moving parts, difficult to set up, and can trip due to wind. Because of the location of the reel, they often ice up and jam, requiring constant adjustments.

These disadvantages can be overcome by providing a durable, portable, compact device in which a seat can be folded down or locked up as well as a removable reel on a sturdy trip device. In addition, the monitoring of other lines by attaching a flagged trip line, allows for simultaneous multiple hole fishing. An attachable tent for protection from the wind is also available.

The device illustrated comprises a non skid base (12) containing a hole or opening 14 near a second end 122 of the base for the purpose of positioning over an augured hole in the ice, and a second elongated hole at the top of the base 12 which acts as a carrying handle (58), at a first end 124 of the base 12 is mounted a collapsible chair mechanism consisting of longitudinal support members (18) which are connected to a crossbar (33) via 90 degrees elbow members (23) and forming an inverted "U" bar support which is connected to the seat (16) with two or more "U" shaped clamps (21) allowing the seat 16 to swivel about the crossbar (33), the open ends of this inverted "U" bar support are connected to the base by means of two "T" shaped rotatable couplers 22, attached to the base 12 by an elongate fastening member (bolt 46) through an arcuate washer 48 inside the second arm 106 of the coupler 22.

A longitudinal member (20) is similarly connected at one of its ends through a rotatable coupler 22 to the rear portion of the seat 16. The opposite end of said member 20 rests in an indentation 126 in the first end 124 of the base 12 when in the "set-up" position.

The rotatable couplers allow the seat to maintain two static positions, namely the "folded down" and "locked up" positions. The "locked up" position is obtained by rotating the "T" shaped coupler 90 degrees about the axis of bolt 46 and its vertical arm 104 illustrated in FIG. (1B). In this second position longitudinal support members 18 and 20 are substantially at right angles to base 12. When body 102 is rotated about the second axis provided by bolt 46 the rotational positioning of arcuate slot 40 relative to bolt 46 is altered such that coupler 22 to which support member 18 is attached can only be pivoted toward the other of support members 18. This vertically locks support members 18, as the relative positioning of seat 16, base 12, and the other of support members 18 precludes pivotal movement.

At the second end 122 of the base 12, two more rotatable couplers 22 are connected to the base 12 and to ends 144 of an inverted "U" bar support 146 consisting of crossbar (33), 90 degree elbow members, (23), and vertical members (30) the inverted "U" crossbar contains a horizontal passageway 128, perpendicular to the crossbar, for the reception of the "double catch-bears paw" steel support line anchor pin (57), the purpose of which will be hereinafter further described. The couplers 22 operate in the same fashion as with seat 16 to permit the "U" bar support 146 to be moved between a first and second position. U-bar support 146 is moveable between a first position in parallel alignment with base 12 and a second position substantially at right angles to base 12. In the second position body 102 of coupler 22 is rotatable about the second axis provided by bolt 46 to alter the relative positioning of slot 40 and bolt 46 such that coupler 22 to which ends 144 of vertical members 30 of U-bar support 146 is attached can only be pivoted toward the other of the vertical members 30 of U-bar support 146. This locks U-bar support 146 in the second position by virtue of the relative positioning of the other of the ends 144 of the U-bar which precludes such pivotal movement.

On the crossbar 33 of this inverted "U" shaped support, is connected via two "U" clamps 21, a rotatable "tip-up" member [receptacle] (28), which is formed to hold a removable reel bearing handle (19). Tip up member 28 has a first end 148 and a second end 150. Reel bearing handle 19 is accommodated in a tongue and groove style receptacle 17 in tip up member 28. A clip 41 is provided to permit a fishing reel 152 to be attached to handle 19. Handle 19 forms part of tip up member 28 and they act as one rotatable member. An opening 154 is provided through handle 19 adjacent first end 148 of tip up member 28. In addition, a vertical passageway 59 is drilled into the crossbar 33 to receive a pin (25) inserted from the bottom upward. This pin is kept in place by the force of the spring device (34) through the "tip-up" member 28 forcing the pin up against the walls of this passageway, the pull of a fish on the line, counterbalanced the holding force of the spring, causing the pin to fall out, and the "tip-up" member to rotate quickly upward at its first end 148 by the pull of the spring 34 downward on its second end 150. Tip up member 28 is rotatable in a first or counterclockwise direction and a second or clockwise direction. A rotation of tip up member 28 caused by a fish tugging on the hook at the end of the fishing line permits the release of the pin 25 and places the spring 34 in tension triggering a violent return rotation of the tip up member 28 in the second direction. This snapping backwards of the "tip-up" member 28 ensures a good "hook" on the fish. At this time the reel bearing handle 19 is removed from the "tip-up" member 28, and the fish is reeled in as normally done.

Figure 3:
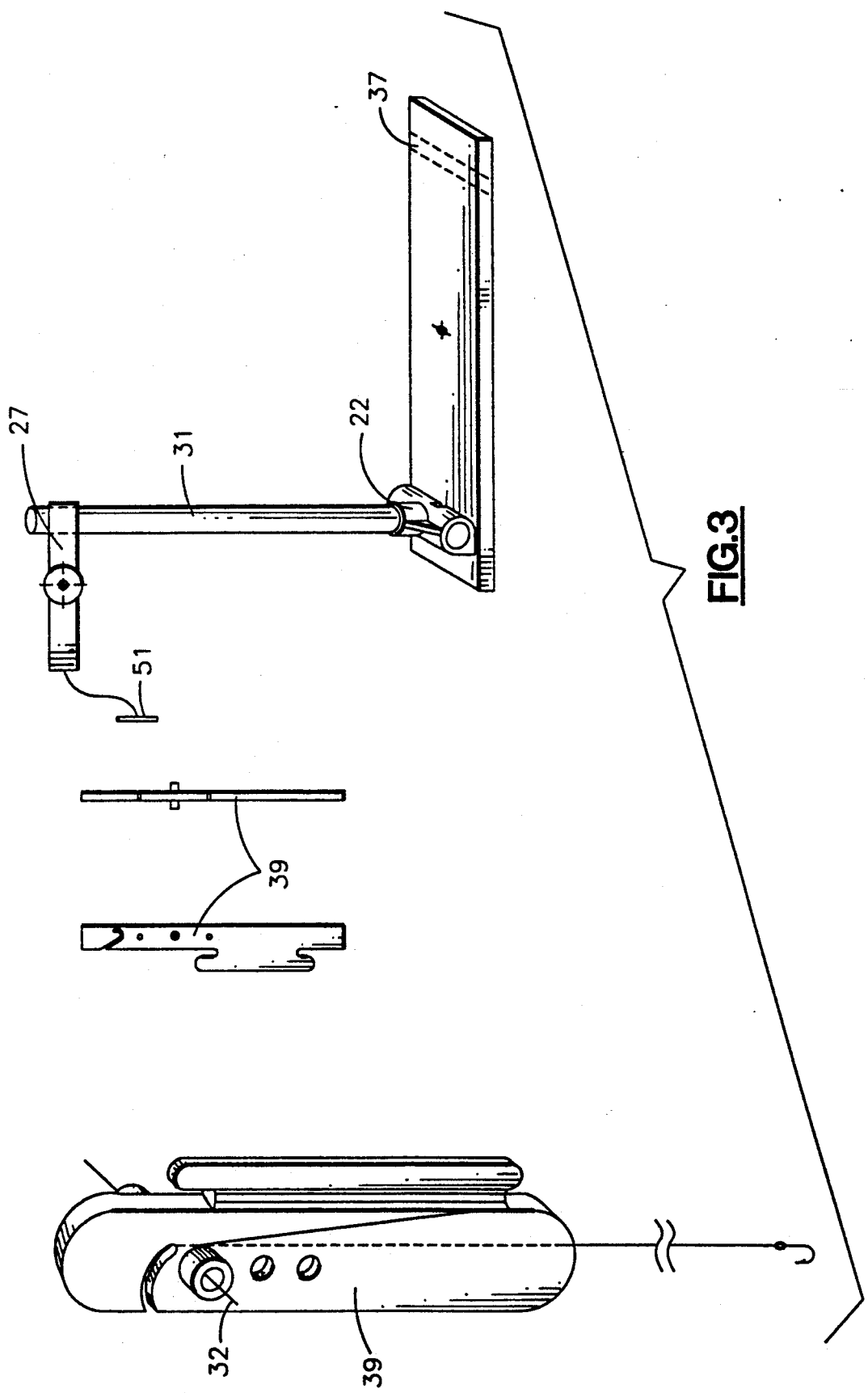
FIG. 3 is an exploded detailed perspective view of a portion of the ice fishing apparatus illustrated in FIG. 1A.

Double catch bears paw devices consist of one or more "double catches" 39 which are flat rectangular planar members having a first end 130 and a second end 132, rounded at each, and having a formed perimeter to allow the winding of a secondary fishing line 133 on one side 134 of the member 39, and having a hollow tubular member 136 inserted through a transverse opening in the form of one of three holes 138 adjacent first end 130 in the member perpendicular to each side of the two flat sides of the member, and having a curved slot 140 formed or cut into the member 39 at the first end 130 of the member adjacent the tubular member 136, as illustrated in FIG. 3.

Figure 5:
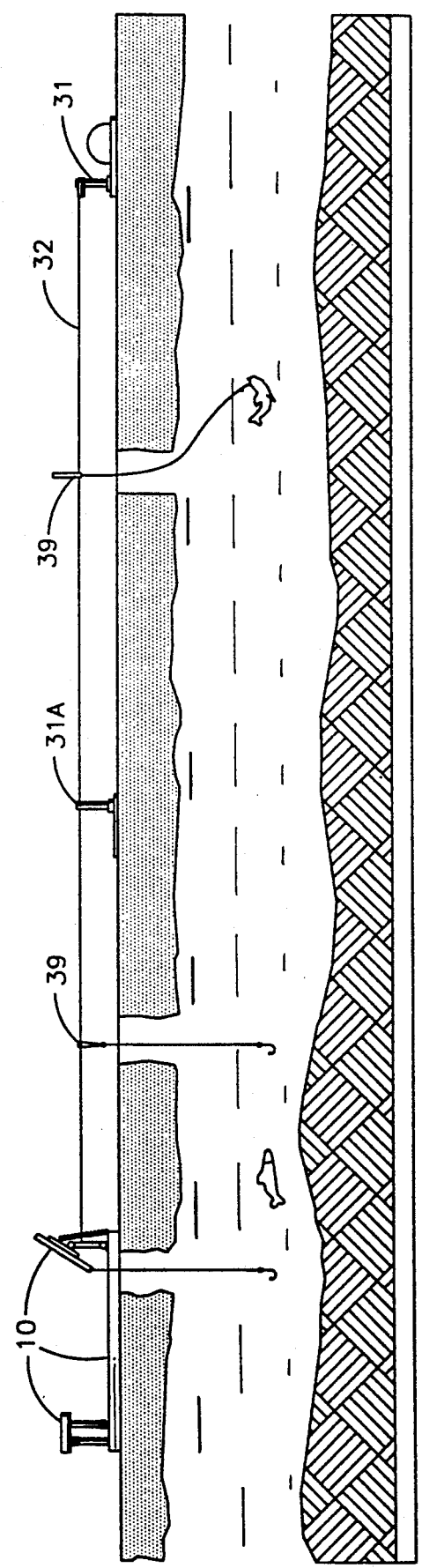
FIG. 5 is a diagrammatic side elevation view of manner of use of the ice fishing apparatus illustrated in FIG. 1A.

The bears paw consists of a planar secondary base 142 with an ice gripping lower surface (not shown). A rotatable coupler 22 is attached to secondary base 142. Into the first end opening 114 of this coupler 22 is inserted a vertical member 31, at the other end of which has a device (27) to retrieve and store a steel support line. Secondary base 142 is intended to be used in concert with the primary base 12 and member 39. A line 32 is extended from reel storage 27 on secondary base 142 through one of holes 138 having the tubular member 136 in member 39 and secured by means of pin 57 in horizontal passageway 128. In use member 39 is suspended from line 32 by extending line 32 through tubular member 136 and securing the free end of the line by means of pin 57 in horizontal passageway 128 of crossmember 33 on base 12. When suspended in this fashion second end 132 of member 39 hands down due to the positioning adjacent first end 130 of holes 138 through which tubular member 136 extends. Secondary fishing line 133 is fed through curved line opening slot 140 and then down through a hole in the ice, as illustrated in FIG. 5. When a fish bites, the force exerted upon secondary fishing line 133 results in a rotation of member 39, thereby raising second end 132 signalling the presence of the fish on secondary line 133. A second bears paw identical to the first except for the omission of the device to retrieve the steel support line, but having a passageway at the free end of the vertical member, at right angles to it, to prevent sagging of the line mid-way through its length, when threaded through this passageway, or to receive the end of the steel support line having the anchor pin, thus acting as a second "terminal" for the steel line when it is not used in conjunction with "Stan's fishing hole" base device.

Because of the action of the rotatable coupler 22, the vertical member of the bears paw may be folded down for ease of packing and transportation.

It will be apparent to one skilled in the art that modifications may be made to the illustrated embodiment without departing from the spirit and scope of the invention as defined by the claims.

I claim:

1. A coupler for collapsible joints, comprising:
   a. hollow body having an interior cavity, an exterior surface with an arcuate portion, and an arcuate slot extending radially from the interior cavity to the exterior surface over at least 90 degrees of the arcuate portion;
   b. means for attaching a first support member to the body;
   c. an elongate base supporting the body;
   d. an elongate fastening member extending through the slot, and being adapted to extend into a second support member thereby securing the body to the second support member, the body rotating about a first axis transverse to the fastening member to the extend that clearance is provided by the slot thereby positioning the support member between a first position in parallel alignment with the base and a second position substantially at right angles to the base, in the second position the body being rotatable about a second axis provided by the fastening member to alter the rotational positioning the slot relative to the fastening member; and e. means positioned within the interior cavity of the body to retain the fastening member within the slot.

2. The coupler for collapsible joints as defined in claim 1, having an arcuate washer disposed within the interior cavity of the body to facilitate movement of the body around the first axis.

3. The coupler for collapsible joints as defined in claim 1, having secondary stop means on the body which engages the second support member as the body rotates about the first axis to limit the rotation of the body.

4. The coupler for collapsible joints as defined in claim 1, the means for attaching a first support member to the body being a cylindrical opening in the body having two opposed vertical guide channels which meet a horizontal guide channel, the vertical guide channels being adapted to receive projecting tits such that a first support member with projecting tits is inserted into the opening and rotated about its axis causing the tits to enter the horizontal guide channel thereby locking the first support member inside the opening.

5. The coupler for collapsible joints as defined in claim 1, the body being generally "T" shaped.

6. A chair with collapsible joints, comprising:
 a. a seat;
 b. a base;
 c. at least two support members each having a first end attached to the seat and a second end pivotally attached by couplers to the base; and
 d. each of the couplers comprising:
  i. a hollow body having an interior cavity, an exterior surface with an arcuate portion, and an arcuate slot extending radially from the interior cavity to the exterior surface over at least 90 degrees of the arcuate portion;
  ii. means for attaching the support member to the body;
  iii. an elongate fastening member extending through the slot into the base thereby securing the body to the base, the body rotating about a first axis transverse to the fastening member to the extent that clearance is provided by the slot thereby positioning the support member between a first position in parallel alignment with the base and a second position substantially at right angles to the base, in the second position the body being rotatable about a second axis provided by the fastening member to alter the rotational positioning of the slot relative to the fastening member such that the body to which the support member is attached can only be pivoted toward the other of the support members, whereby each of the support members is locked in the second position by virtue of the relative positioning of the seat, the base, and the other of the support members which precludes such pivotal movement.

7. An ice fishing apparatus with collapsible joints, comprising:
 a. a seat;
 b. a base having an opening;
 c. at least two support members each having a first end attached to the seat and a second end pivotally attached by couplers to the base;
 d. each of the couplers comprising:
  i. a hollow body having an interior cavity, an exterior surface with an arcuate portion, and an arcuate slot extending radially from the interior cavity to the exterior surface over at least 90 degrees of the arcuate portion;
  ii. means for attaching the support member to the body;
  iii. an elongate fastening member extending through the slot into the base thereby securing the body to the base, the body rotating about a first axis transverse to the fastening member to the extent that clearance is provided by the slot thereby positioning the support member between a first position in parallel alignment with the base and a second position substantially at right angles to the base, in the second position the body being rotatable about a second axis provided by the fastening member to alter the relative positioning of the slot and the fastening member such that the body to which the support member is attached can only be pivoted toward the other of the support members, whereby each of the support members is locked in the second position by virtue of the relative positioning of the seat, the base, and the other of the support members which precludes such pivotal movement;
 e. a trip switch mechanism support connected to the base; and
 f. a trip switch mechanism connected to the trip switch mechanism support and locatable over the opening in the base.

8. The ice fishing apparatus as defined in claim 7, the trip switch mechanism support being a U-bar having vertical members with a connecting crosspiece, the U-bar having ends pivotally attached to the base by couplers, each of the couplers comprising:
 i. a hollow body having an interior cavity, an exterior surface with an arcuate portion, and an arcuate slot extending radially from the interior cavity to the exterior surface over at least 90 degrees of the arcuate portion;
 ii. means for attaching one of the ends of the U-bar to the body;
 iii. an elongate fastening member extending through the slot into the base thereby securing the body to the base, the body rotating about a first axis transverse to the fastening member to the extent that clearance is provided by the slot thereby positioning the U-bar between a first position in parallel alignment with the base and a second position substantially at right angles to the base, in the second position the body being rotatable about a second axis provided by the fastening member to alter the relative positioning of the slot and the fastening member such that the body to which one end of the U-bar is attached can only be pivoted toward the other of the U-bar, whereby each of the U-bar is locked in the second position by virtue of the relative positioning of the other of the ends of the U-bar which precludes such pivotal movement.

9. The ice fishing apparatus as defined in claim 7, the trip switch mechanism comprising:
 a. a rotatable member rotatably connected transversely to the crosspiece, and having a first end and a second end disposed on either side of the U-bar, the rotatable member being rotatable in a first direction and a second direction;

b. means to receive a fishing line positioned at the first end of the rotatable member;

c. a reel receptacle attached to the rotatable member;

d. a passageway through the U-bar adapted to receive a pin;

e. a pin loosely insertable in the passageway; and f. a spring biasing the rotatable member in the second direction such that the rotatable member rests against the pin thereby maintaining the pin in the passageway and limiting the rotational movement of the rotatable member in the second direction and such that a rotation of the rotatable member in the first direction caused by a fish tugging on a hook at the end of the fishing line permits the release of the pin and places the spring in tension triggering a violent return rotation of the rotatable member in the second direction whereby the hook is imbedded into the fish.

10. The ice fishing apparatus as defined in claim 7, in combination with:

a. at least one line support, comprising:
  i. a secondary base;
  ii. a support member extending from the secondary base;

b. a line extending from the support member of the line support to a line support member secured to the base of the ice fishing apparatus; and c. at least one secondary line storage and flag apparatus, comprising:
  i. an elongate body having a first end, a second end, and opposed sides;
  ii. means for winding a secondary fishing line on one of the opposed sides of the body;
  iii. a line opening to accommodate the secondary fishing line adjacent the first end of the body; and
  iv. a transverse opening extending through the body adjacent the first end, the transverse opening providing means whereby the body is suspended with the second end pointing downwards on the line which extends from the support member of the line support to the line support secured to the base of the ice fishing apparatus, such that when the secondary fishing line is fed through the line opening and then suspended from the body, a force exerted upon the secondary fishing line results in a rotation of the body thereby raising the second end of the body to signal the presence of a fish on the secondary line.

* * * * *